(12) United States Patent
Kenyon et al.

(10) Patent No.: US 10,581,646 B1
(45) Date of Patent: Mar. 3, 2020

(54) ASYNCHRONOUS DATA CORRECTION FILTER

(71) Applicant: TEXAS INSTRUMENTS INCORPORATED, Dallas, TX (US)

(72) Inventors: Eleazar Walter Kenyon, Tucker, GA (US); Michael Gerald Vrazel, Atlanta, GA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/431,999

(22) Filed: Jun. 5, 2019

Related U.S. Application Data

(60) Provisional application No. 62/777,380, filed on Dec. 10, 2018.

(51) Int. Cl.
*H04L 25/03* (2006.01)
(52) U.S. Cl.
CPC .............................. *H04L 25/03006* (2013.01)
(58) Field of Classification Search
CPC ............... H04L 25/03038; H04L 27/01; H04L 25/03019; H04L 25/03133; H04L 7/0054; H04B 3/141; H04B 3/145
See application file for complete search history.

(56) References Cited

U.S. PATENT DOCUMENTS

| | | | | |
|---|---|---|---|---|
| 6,014,768 A * | 1/2000 | Lee | ...................... | H04L 1/0054 |
| | | | | 714/746 |
| 6,819,166 B1 * | 11/2004 | Choi | .................. | H04L 25/03885 |
| | | | | 327/551 |
| 8,175,143 B1 * | 5/2012 | Wong | ................. | H04L 25/03057 |
| | | | | 375/229 |
| 9,450,788 B1 * | 9/2016 | Cops | .................. | H04L 25/03057 |
| 9,853,839 B2 * | 12/2017 | Beukema | .......... | H04L 25/03019 |
| 2004/0257253 A1 * | 12/2004 | Jones | ............... | G11B 20/10203 |
| | | | | 341/143 |
| 2005/0254568 A1 * | 11/2005 | Markman | ......... | H04L 25/03057 |
| | | | | 375/233 |
| 2008/0187035 A1 * | 8/2008 | Nakamura | ............ | H03F 1/0288 |
| | | | | 375/232 |
| 2013/0101010 A1 * | 4/2013 | Casas | ...................... | H04L 27/01 |
| | | | | 375/233 |
| 2019/0305810 A1 * | 10/2019 | Pham | .................. | H04L 25/0272 |

* cited by examiner

*Primary Examiner* — Khanh C Tran
(74) *Attorney, Agent, or Firm* — John R. Pessetto; Charles A. Brill; Frank D. Cimino

(57) ABSTRACT

A data correction filter includes an equalizer circuit, first, second, and third asynchronous comparators, an error amplifier, a multiplexer, a delay circuit, first and second exclusive-OR gates, and first and second integrator circuits. The first asynchronous comparator is coupled to the equalizer circuit. The second and third asynchronous comparators are coupled to the equalizer circuit and the error amplifier. The multiplexer is coupled to the first, second, and third asynchronous comparators. The delay circuit is coupled to the first asynchronous comparator. The first exclusive-OR gate is coupled to the delay circuit and the multiplexer. The second exclusive-OR gate is coupled to the first asynchronous comparator and the multiplexer. The first integrator circuit is coupled to first exclusive-OR gate and the equalizer circuit. The second integrator circuit is coupled to the second exclusive-OR gate and the error amplifier.

21 Claims, 3 Drawing Sheets

ASYNCHRONOUS DATA CORRECTION FILTER

CROSS-REFERENCE TO RELATED APPLICATIONS

The present application claims priority to U.S. Provisional Patent Application No. 62/777,380, filed Dec. 10, 2018, entitled "Asynchronous LMS Filter Adaptation," which is hereby incorporated herein by reference in its entirety.

BACKGROUND

Inter-symbol interference (ISI) is a form of noise on a signal caused by successive transmission of data values; where a data value transmitted at a first time creates distortion in a data value transmitted at a second time. ISI may be present when transmitting via wired or wireless media, and may be caused by the existence of multiple propagation paths from transmitter to receiver, or transmission via a bandlimited channel. ISI degrades the signal at the receiver and may make recovery of the signal difficult. A receiver may include an equalizer to compensate for amplitude and phase distortions caused by ISI in received signals.

SUMMARY

A data correction filter for reducing inter-symbol interference in a received digital signal is disclosed herein. In one example, a data correction filter includes an equalizer control loop and an error control loop. The equalizer control loop includes an equalizer circuit, a data slicer circuit, a delay circuit, and a first integrator circuit. The data slicer circuit is coupled to an output of the equalizer circuit. The delay circuit is coupled to an output of the data slicer circuit. The first integrator circuit includes an input and an output. The input is coupled to an output of the delay circuit, and the output is coupled to an input of the equalizer circuit. The error control loop includes an error amplifier, an error slicer circuit, a multiplexer, and a second integrator circuit. The error slicer circuit includes a first input, a second input and a third input. The first input is coupled to a first output of the error amplifier. The second input is coupled to a second output of the error amplifier. The third input is coupled to the output of the equalizer circuit. The multiplexer includes a first data input, a second data input, and a select input. The first data input is coupled to a first output of the error slicer circuit. The second data input is coupled to a second output of the data slicer circuit. The select input is coupled to the output of the data slicer circuit. The second integrator circuit includes an input coupled to an output of the multiplexer, and an output coupled to an input of the error amplifier.

In another example, a data correction filter includes an equalizer control loop and an error control loop. The equalizer control loop includes an equalizer circuit and an equalizer control circuit. The equalizer circuit is configured to compensate for distortion of a digital input signal. The equalizer control circuitry is coupled to the equalizer circuit, and is configured to asynchronously measure inter-symbol interference in output signal of the equalizer circuit, and to provide a control signal to the equalizer circuit that causes the equalizer circuit to reduce the inter-symbol interference. The error control loop coupled to the equalizer control loop, and configured to asynchronously compare the output signal of the equalizer circuit to a first error threshold and a second error threshold, and to adjust the first error threshold and the second error threshold based on results of asynchronous comparison of the output signal of the equalizer circuit to a first error threshold and a second error threshold.

In a further example, a data correction filter includes an equalizer circuit, a first asynchronous comparator, an error amplifier, a second asynchronous comparator, a third asynchronous comparator, a multiplexer, a delay circuit, a first exclusive-OR gate, a second exclusive-OR gate, a first integrator circuit, and a second integrator circuit. The first asynchronous comparator is coupled to the equalizer circuit. The second asynchronous comparator is coupled to the equalizer circuit and the error amplifier. The third asynchronous comparator is coupled to the equalizer circuit and the error amplifier. The multiplexer is coupled to the first asynchronous comparator, the second asynchronous comparator, and the third asynchronous comparator. The delay circuit is coupled to the first asynchronous comparator. The first exclusive-OR gate is coupled to the delay circuit and the multiplexer. The second exclusive-OR gate is coupled to the first asynchronous comparator and the multiplexer. The first integrator circuit is coupled to first exclusive-OR gate and the equalizer circuit. The second integrator circuit is coupled to the second exclusive-OR gate and the error amplifier.

BRIEF DESCRIPTION OF THE DRAWINGS

For a detailed description of various examples, reference will now be made to the accompanying drawings in which.

DETAILED DESCRIPTION

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

Many receivers that include equalization employ clocked least mean squared (LMS) methods that extract a clock signal from received data and apply the extracted dock to reclock received data. The circuitry for implementing docked LMS equalization is complex. To reduce circuit complexity, some receivers forgo clocked equalization and implement asynchronous equalization using energy-based techniques. The energy-based techniques measure signal energy in an equalized signal before and after a limiting amplifier, and use the measurements to infer the residual ISI at the equalizer output. Asynchronous energy-based techniques are less robust than clocked LMS methods.

The data correction filter disclosed herein does not extract a dock from or otherwise reclock the received data. The data correction filter of the present disclosure uses asynchronous circuitry to measure inter-symbol interference (ISI) and tune an equalizer to reduce the ISI. The data correction filter provides more robust equalization that energy-based techniques, and provides performance approaching that of clocked LMS without the complexity of clock regeneration.

Figure 1:
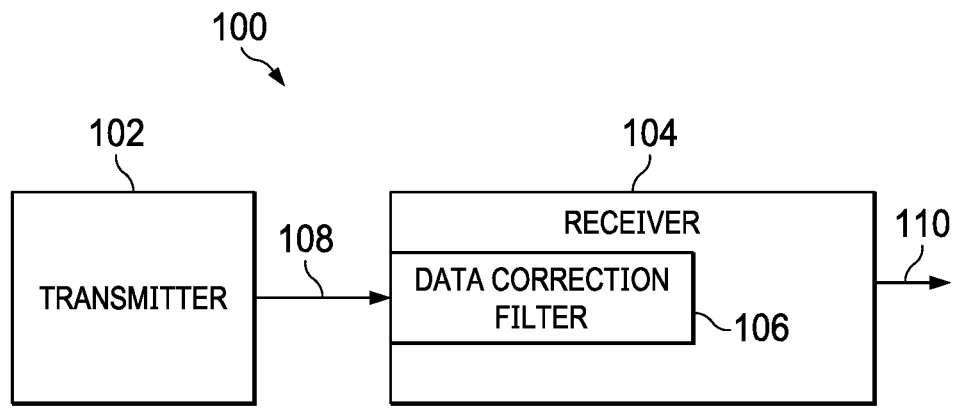
FIG. 1 shows a block diagram for an example system that includes an asynchronous data correction filter in accordance with this description.

FIG. 1 shows a block diagram for an example system 100 that includes an asynchronous data correction filter in accordance with this description. The system 100 is any system that transmits and received digital data, such as a computer or other device implementing Peripheral Component Interconnect Express (PCI Express) or other wired or wireless data communication system. The system 100 includes a transmitter 102 and a receiver 104. The transmitter 102 transmits digital data, and the receiver 104 receives the digital data transmitted by the transmitter 102. The data signal 108 transmitted by the transmitter 102 is encoded and/or modulated using any of a variety of techniques. The data signal 108 is differential in some implementations of the system 100.

The receiver 104 includes an asynchronous data correction filter 106. The asynchronous data correction filter 106 modifies the phase and/or frequency content of the data signal 108 received at the receiver 104 to correct for ISI introduced in the channel through which the data signal 108 passed between the transmitter 102 and the receiver 104. Some implementations of the asynchronous data correction filter 106 provide a form of least mean squares filtering to correct the received data signal 108. The asynchronous data correction filter 106 does not reclock the data signal 108 received from the transmitter 102 and does not extract a clock from the data signal 108 for use in correcting the data signal 108. Rather, the asynchronous data correction filter 106 directly measures ISI in the received data signal 108 and corrects for the ISI without using a clock. The receiver 104 provides data 110 processed by the asynchronous data correction filter 106, and other circuits of the receiver 104 to other circuitry of the system 100 for further processing.

Figure 2:
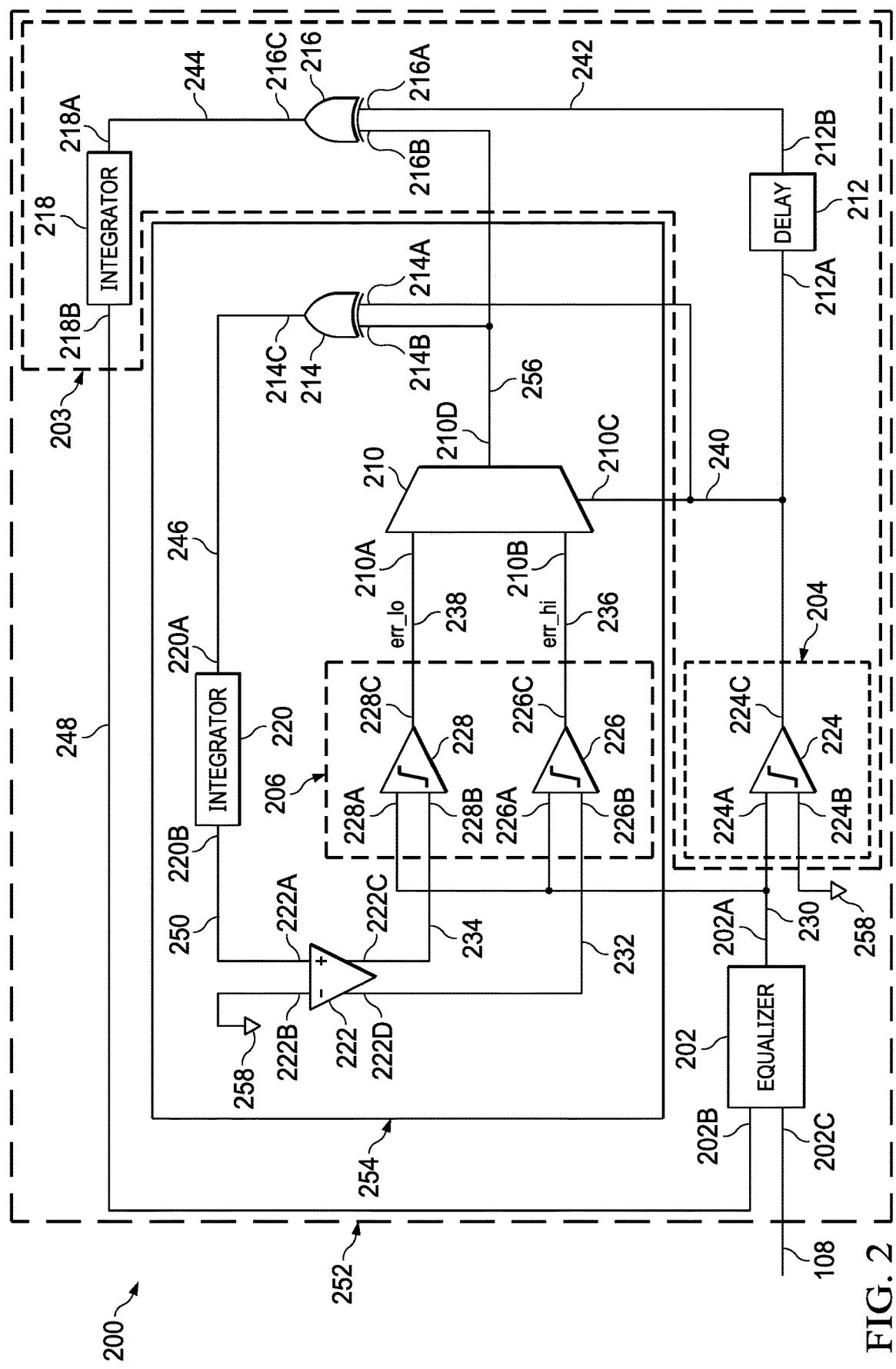
FIG. 2 shows a block diagram for an example asynchronous data correction filter in accordance with this description.

FIG. 2 shows a block diagram for an example asynchronous data correction filter 200 in accordance with this description. The asynchronous data correction filter 200 is an implementation of the asynchronous data correction filter 106. The asynchronous data correction filter 200 includes an equalizer control loop 252 and an error control loop 254. The equalizer control loop 252 sets a threshold for equalization and modifies the phase and/or frequency of the data signal 108 to reduce ISI. The error control loop 254 measures error in the equalized signal and sets thresholds for measuring the error. The equalizer control loop 252 includes an equalizer circuit 202 and equalizer control circuitry 203 coupled to the equalizer circuit 202. The equalizer circuit 202 compensates for distortion in the data signal 108. The equalizer control circuitry 203 asynchronously measures ISI in the output signal 230 of the equalizer circuit 202, and generates a control signal 248 that the equalizer circuit 202 applies to reduce the ISI. The error control loop 254 is coupled to the equalizer control loop 252, and asynchronously generates thresholds (first and second error thresholds) for error measurements, and compares the output signal 230 of the equalizer circuit 202 to the error thresholds to measure error in the output signal 230. The error control loop 254 adjusts the error thresholds based on results of asynchronous comparison of the output signal 230 of the equalizer circuit 202 to the error thresholds.

The equalizer control circuitry 203 includes a data slicer circuit 204, a delay circuit 212, an exclusive-OR gate 216, and an integrator circuit 218. The data slicer circuit 204 is coupled to an output 202A of the equalizer circuit 202. The data slicer circuit 204 includes an asynchronous analog comparator 224 that compares the output signal 230 of the equalizer circuit 202 to a reference voltage, such as ground. The asynchronous analog comparator 224 includes an input 224A coupled to the output 202A of the equalizer circuit 202, an input 224B coupled to a reference voltage source (e.g., a ground rail 258), and an output 224C.

The delay circuit 212 includes an input 212A that is coupled to the output 224C of the asynchronous analog comparator 224. The delay circuit 212 delays the output signal 240 of the asynchronous analog comparator 224 by one bit period (or unit interval) of the output signal 230. The output 212B of the delay circuit 212 is coupled to an input 216A of the exclusive-OR gate 216. The exclusive-OR gate 216 is a multiplier that multiplies output signal 242 of the delay circuit 212 with output signal 256 of the error control loop 254 to generate a difference signal 244. Some implementations of the asynchronous data correction filter 200 may replace the exclusive-OR gate 216 with other digital multiplier circuitry or an analog multiplier. The exclusive-OR gate 216 includes an input 216B that is coupled to the error control loop 254. The output 216C of the exclusive-OR gate 216 is coupled to an input 218A of the integrator circuit 218.

The integrator circuit 218 accumulates and low pass filters the difference signal 244 of the exclusive-OR gate 216. The control signal 248 generated by the integrator circuit 218 is provided to the equalizer circuit 202 to control the frequency and/or phase response thereof. The output 218B of the integrator circuit 218 is coupled to an input 202C of the equalizer circuit 202. Examples of the integrator circuit 218 may be implemented as analog or digital integrator circuits. The input 202B of the equalizer circuit 202 receives the data signal 108.

The error control loop 254 includes error slicer circuitry 206, a multiplexer 210, an exclusive-OR gate 214, an integrator circuit 220, and an error amplifier 222. The error amplifier 222 is a differential amplifier that generates the error thresholds. A first error threshold 234 is provided at a positive output 222C of the error amplifier 222 and a second error threshold 232 is provided at a negative output 222D of the error amplifier 222. The error slicer circuitry 206 includes an asynchronous analog comparator 226 and an asynchronous analog comparator 228. The asynchronous analog comparator 226 compares the output signal 230 of the equalizer circuit 202 to the second error threshold 232 provided by the error amplifier 222, and the asynchronous analog comparator 228 compares the output signal 230 of the equalizer circuit 202 to the first error threshold 234 provided by the error amplifier 222. The asynchronous analog comparator 226 includes an input 226A coupled to the output 202A of the equalizer circuit 202, and an input 226B coupled to the negative output 222D of the error amplifier 222. The asynchronous analog comparator 228 includes an input 228A coupled to the output 202A of the equalizer circuit 202, and an input 228B coupled to the positive output 222C of the error amplifier 222.

The multiplexer 210 is coupled to the asynchronous analog comparator 226, the asynchronous analog comparator 228 and the asynchronous analog comparator 224. The multiplexer 210 selects the output signal 236 generated by the asynchronous analog comparator 226 or the output signal 238 generated by the asynchronous analog comparator 228 based on the output signal 240 generated by the asynchronous analog comparator 224. If the output signal 240 is in a logic "low" state, then the multiplexer 210 routes the output signal 238 generated by the asynchronous analog comparator 228 to the output of the multiplexer 210. If the output signal 240 is in a logic "high" state, then the multiplexer 210 routes the output signal 236 generated by the asynchronous analog comparator 226 to the output of the multiplexer 210. Thus, the error information propagated by the multiplexer 210 corresponds to the state of the current bit of the output signal 230 identified by the asynchronous analog comparator 224. The multiplexer 210 includes a data input 210A coupled to the output 228C of the asynchronous analog comparator 228, a data input 210B coupled to the output 226C of the asynchronous analog comparator 226, and a select input 210C coupled to the output 224C of the asynchronous analog comparator 224. The output 210D of the multiplexer 210 is coupled to the input 214A of the exclusive-OR gate 214 and the input 216B of the exclusive-OR gate 216.

The exclusive-OR gate 214 is a digital multiplier that multiplies output signal 240 of the asynchronous analog comparator 224 with output signal 256 of the multiplexer 210 to generate a difference signal 246. Some implementations of the asynchronous data correction filter 200 may replace the exclusive-OR gate 216 with other digital multiplier circuitry or an analog multiplier. The exclusive-OR gate 214 includes an input 214A that is coupled to the output 210D of the multiplexer 210, and an input 214B that is coupled to the output 224C of the asynchronous analog comparator 224. The output 214C of the exclusive-OR gate 214 is coupled to an input 220A of the integrator circuit 220. The integrator circuit 220 accumulates and low pass filters the difference signal 246 of the exclusive-OR gate 214. The output signal 250 of the integrator circuit 220 is an error reference signal that is provided to the error amplifier 222. The output 220B of the integrator circuit 220 is coupled to an input 222A of the error amplifier 222. Examples of the integrator circuit 220 may be implemented as analog or digital integrator circuits. The input 222B of the error amplifier 222 is coupled to reference voltage source (e.g., a ground rail 258). Some implementations of the error control loop 254 use a differential filter that directly drives the asynchronous analog comparator 226 and the asynchronous analog comparator 228 in place of the error amplifier 222.

Figure 3:
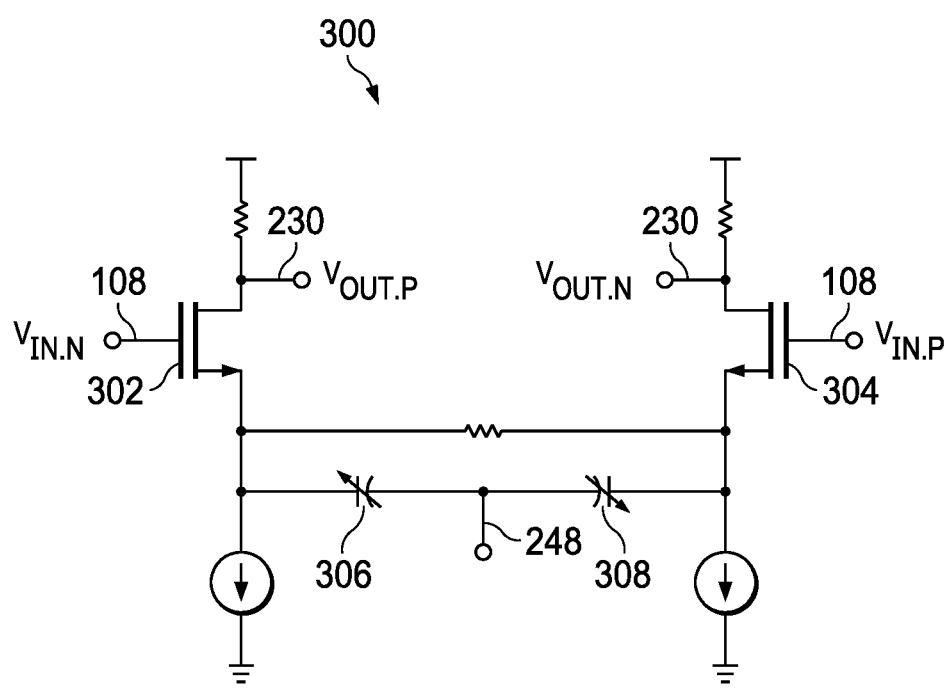
FIG. 3 shows a schematic level diagram for an example equalizer circuit suitable for use in an asynchronous data correction filter in accordance with this description.

FIG. 3 shows a schematic level diagram for an example equalizer circuit 300 suitable for use in an asynchronous data correction filter in accordance with this description. The equalizer circuit 300 is an implementation of the equalizer circuit 202. The equalizer circuit 300 includes a transistor 302 and a transistor 304 that receive and amplify the data signal 108 (the data signal 108 is differential in this implementation). Variable capacitor 306 and variable capacitor 308 are coupled to the transistor 302 and the transistor 304. The control signal 248 controls the capacitance of the variable capacitor 306 and the variable capacitor 308 to change the frequency and/or phase response of the equalizer circuit 300. Other examples of the equalizer circuit 202 may include a digital equalizer circuit or a different analog equalizer circuit.

Figure 4:
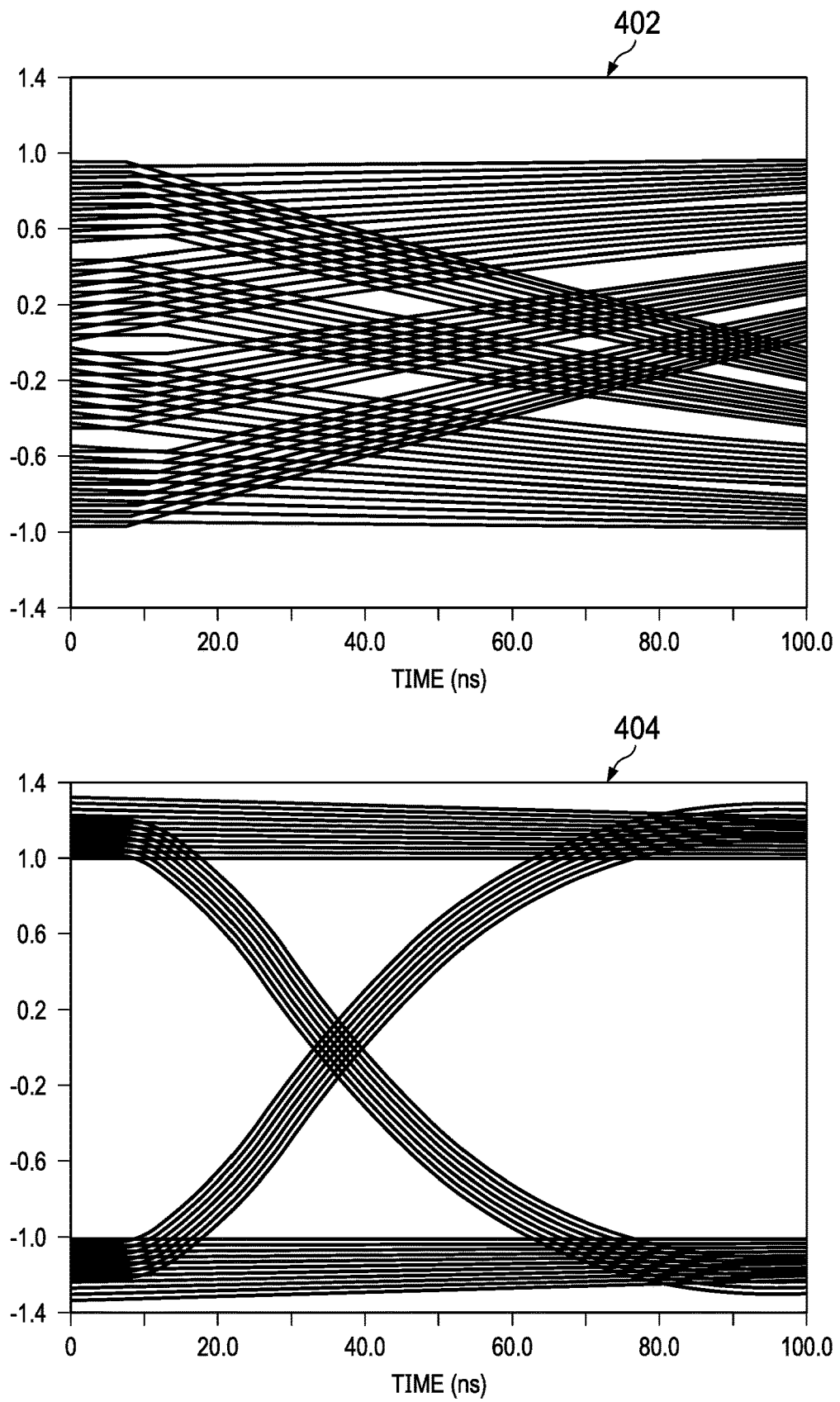
FIG. 4 shows an example of results of equalization of received data using a data correction filter in accordance with the present description.

FIG. 4 shows an example of results of equalization of received data using a data correction filter in accordance with the present description. Diagram 402 shows eye data for the data signal 108 (i.e., eye data for the received data signal 108 prior to equalization by the asynchronous data correction filter 200). Diagram 404 shows eye data for the output signal 230 generated by equalizing the data signal 108 in the asynchronous data correction filter 200. As shown in FIG. 4, the asynchronous data correction filter 200 effectively compensates for the distortion of the data signal 108 in the channel through which the data signal 108 is transmitted.

Modifications are possible in the described embodiments, and other embodiments are possible, within the scope of the claims.

What is claimed is:

1. A data correction filter, comprising:
   an equalizer control loop, comprising:
      an equalizer circuit;
      a data slicer circuit coupled to an output of the equalizer circuit;
      a delay circuit coupled to an output of the data slicer circuit;
      a first integrator circuit comprising:
         an input coupled to an output of the delay circuit; and
         an output coupled to an input of the equalizer circuit; and
   an error control loop, comprising:
      an error amplifier;
      an error slicer circuit, comprising:
         a first input coupled to a first output of the error amplifier;
         a second input coupled to a second output of the error amplifier; and
         a third input coupled to the output of the equalizer circuit;
      a multiplexer comprising:
         a first data input coupled to a first output of the error slicer circuit;
         a second data input coupled to a second output of the error slicer circuit; and
         a select input coupled to the output of the data slicer circuit;
      a second integrator circuit comprising:
         an input coupled an output of the multiplexer; and
         an output coupled to an input of the error amplifier.

2. The data correction filter of claim 1, wherein the data slicer circuit comprises an asynchronous comparator, comprising:
   a first input coupled to a reference voltage source;
   a second input coupled to the output of the equalizer circuit; and
   an output coupled to the select input of the multiplexer and an input of the delay circuit.

3. The data correction filter of claim 1, wherein the error slicer circuit comprises:
   a first asynchronous comparator, comprising:
      a first input coupled to the output of the equalizer circuit;
      a second input coupled to the first output of the error amplifier; and
      an output coupled to the first data input of the multiplexer; and
   a second asynchronous comparator, comprising:
      a first input coupled to the output of the equalizer circuit;
      a second input coupled to the second output of the error amplifier; and
      an output coupled to the second data input of the multiplexer.

4. The data correction filter of claim 1, wherein the delay circuit is configured to delay a signal generated by the data slicer circuit by one bit period.

5. The data correction filter of claim 1, wherein the equalizer control loop comprises an exclusive-OR gate comprising:
   a first input coupled to the output of the delay circuit;
   a second input coupled to the output of the multiplexer; and an output coupled to the input of the first integrator circuit.

6. The data correction filter of claim 1, wherein the error control loop comprises an exclusive-OR gate comprising:
a first input coupled to the output of the multiplexer;
a second input coupled to the output of the data slicer circuit; and
an output coupled to the input of the second integrator circuit.

7. A data correction filter, comprising:
an equalizer control loop, comprising:
an equalizer circuit configured to compensate for distortion of a digital input signal; and
equalizer control circuitry coupled to the equalizer circuit, and configured to:
asynchronously measure inter-symbol interference in output signal of the equalizer circuit; and
provide a control signal to the equalizer circuit that causes the equalizer circuit to reduce the inter-symbol interference;
an error control loop coupled to the equalizer control loop, and configured to:
asynchronously compare the output signal of the equalizer circuit to a first error threshold and a second error threshold; and
adjust the first error threshold and the second error threshold based on results of asynchronous comparison of the output signal of the equalizer circuit to the first error threshold and the second error threshold.

8. The data correction filter of claim 7, wherein:
the equalizer control circuitry comprises a first asynchronous analog comparator configured to compare the output signal of the equalizer circuit to a reference voltage; and
the error control loop comprises:
a second asynchronous analog comparator configured to compare the output signal of the equalizer circuit to the first error threshold; and
a third asynchronous analog comparator configured to compare the output signal of the equalizer circuit to the second error threshold.

9. The data correction filter of claim 8, wherein the error control loop comprises a multiplexer configured to selectably route an output signal of the second asynchronous analog comparator or an output signal of the third asynchronous analog comparator to an output of the multiplexer based on an output signal of the first asynchronous analog comparator.

10. The data correction filter of claim 9, wherein the error control loop comprises a multiplier circuit configured to multiply an output signal of the multiplexer and an output signal of the first asynchronous analog comparator.

11. The data correction filter of claim 10, wherein the multiplier circuit comprises an exclusive-OR gate or an analog multiplier.

12. The data correction filter of claim 10, wherein the error control loop comprises:
an integrator circuit configured to filter an output signal of the multiplier circuit; and
an error amplifier configured to generate the first error threshold and the second error threshold based on an output signal of the integrator circuit.

13. The data correction filter of claim 9, wherein the equalizer control circuitry comprises a delay circuit configured to delay output signal of the first asynchronous analog comparator by one bit period.

14. The data correction filter of claim 13, wherein the equalizer control circuitry comprises:
a multiplier circuit configured to multiply an output signal of the delay circuit and an output signal of the multiplexer; and
an integrator circuit configured to filter an output signal of the multiplier circuit to generate the control signal provided to the equalizer circuit.

15. A data correction filter, comprising:
an equalizer circuit;
a first asynchronous comparator coupled to the equalizer circuit;
an error amplifier;
a second asynchronous comparator coupled to the equalizer circuit and the error amplifier;
a third asynchronous comparator coupled to the equalizer and the error amplifier;
a multiplexer coupled to the first asynchronous comparator, the second asynchronous comparator, and the third asynchronous comparator;
a delay circuit coupled to the first asynchronous comparator;
a first exclusive-OR gate coupled to the delay circuit and the multiplexer;
a second exclusive-OR gate coupled to the first asynchronous comparator and the multiplexer;
a first integrator circuit coupled to first exclusive-OR gate and the equalizer circuit; and
a second integrator circuit coupled to the second exclusive-OR gate and the error amplifier.

16. The data correction filter of claim 15, wherein the first asynchronous comparator comprises:
a first input coupled to an output of the equalizer circuit;
a second input coupled to a reference voltage source; and
an output coupled to an input of the delay circuit, an input of the multiplexer, and an input of the second exclusive-OR gate.

17. The data correction filter of claim 15, wherein:
the second asynchronous comparator comprises:
a first input coupled to an output of the equalizer circuit;
a second input coupled to a first output of the error amplifier; and
an output coupled to a first data input of the multiplexer; and
the third asynchronous comparator comprises:
a first input coupled to the output of the equalizer circuit;
a second input coupled to a second output of the error amplifier; and
an output coupled to a second data input of the multiplexer.

18. The data correction filter of claim 15, wherein the multiplexer comprises:
a first data input coupled to an output of the second asynchronous comparator;
a second data input coupled to an output of the third asynchronous comparator;
a select input coupled to an output of the first asynchronous comparator; and
an output coupled to an input of the first exclusive-OR gate and an input of the second exclusive-OR gate.

19. The data correction filter of claim 15, wherein:
the first exclusive-OR gate comprises:
a first input coupled to an output of the multiplexer;
a second input coupled to an output of the delay circuit; and an output coupled to an input of the first integrator circuit; and the second exclusive-OR gate comprises:
a first input coupled to an output of the first asynchronous comparator;
a second input coupled to an output of the multiplexer; and
an output coupled to an input of the second integrator circuit.

20. The data correction filter of claim 15, wherein:
the first integrator circuit comprises:
an input coupled to an output of the first exclusive-OR gate; and
an output coupled to an input of the equalizer circuit; and the second integrator circuit comprises:
an input coupled to an output of the second exclusive-OR gate; and
an output coupled to an input of the error amplifier.

21. The data correction filter of claim 15, wherein the error amplifier comprises:
a first input coupled to an output of the second integrator circuit;
a second input coupled to a reference voltage source;
a first output coupled to an input of the second asynchronous comparator; and
a second output coupled to an input of the third asynchronous comparator.

* * * * *